United States Patent
Law et al.

(10) Patent No.: US 7,865,251 B2
(45) Date of Patent: Jan. 4, 2011

(54) METHOD FOR INTERCONTROLLER COMMUNICATIONS IN A SAFETY INSTRUMENTED SYSTEM OR A PROCESS CONTROL SYSTEM

(75) Inventors: Gary Keith Law, Georgetown, TX (US); Kent Allan Burr, Round Rock, TX (US); Godfrey Roland Sherriff, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 783 days.

(21) Appl. No.: 11/540,120

(22) Filed: Sep. 29, 2006

(65) Prior Publication Data
US 2007/0083275 A1 Apr. 12, 2007

Related U.S. Application Data

(63) Continuation-in-part of application No. 10/352,396, filed on Jan. 28, 2003, now Pat. No. 7,289,861.

(51) Int. Cl.
*G05B 11/01* (2006.01)
*G05B 15/00* (2006.01)
*G06F 15/16* (2006.01)

(52) U.S. Cl. .............................. 700/19; 700/83; 709/208
(58) Field of Classification Search .................... 700/2, 700/19, 17, 83; 709/220
See application file for complete search history.

(56) References Cited

U.S. PATENT DOCUMENTS

| | | | |
|---|---|---|---|
| 3,849,056 A | 11/1974 | Schuss | |
| 4,410,329 A | 10/1983 | Blevins et al. | |
| 4,598,355 A | 7/1986 | Shepler et al. | |
| 4,628,435 A | 12/1986 | Tashiro et al. | |
| 4,736,320 A | 4/1988 | Bristol | |
| 4,816,647 A | 3/1989 | Payne | |
| 4,827,423 A | 5/1989 | Beasley et al. | |
| 4,885,717 A | 12/1989 | Beck et al. | |
| 4,972,328 A | 11/1990 | Wu et al. | |
| 5,014,208 A | 5/1991 | Wolfson | |

(Continued)

FOREIGN PATENT DOCUMENTS

DE 298 24 256 7/2001

(Continued)

OTHER PUBLICATIONS

Search Report for Application No. GB0719122.4, dated Jan. 25, 2008.

(Continued)

*Primary Examiner*—Albert DeCady
*Assistant Examiner*—Darrin Dunn
(74) *Attorney, Agent, or Firm*—Marshall, Gerstein & Borun LLP

(57) ABSTRACT

The claimed system provides an I/O card that is used to interface two process controllers over a communication line that is separate from a primary communication line connecting the two process controllers to a workstation. The process controllers can access the I/O cards in a similar manner to I/O cards used to connect to field devices. In this manner, the physical hardware and software architecture does not need to be modified for inter-controller communications. Inter-controller communications can be programmed as general I/O communication.

37 Claims, 9 Drawing Sheets

U.S. PATENT DOCUMENTS

| | | | |
|---|---|---|---|
| 5,051,898 A | 9/1991 | Wright et al. | |
| 5,146,401 A | 9/1992 | Bansal et al. | |
| 5,168,441 A | 12/1992 | Onarheim et al. | |
| 5,195,098 A | 3/1993 | Johnson et al. | |
| 5,321,829 A | 6/1994 | Zifferer | |
| 5,339,430 A | 8/1994 | Lundin et al. | |
| 5,420,397 A | 5/1995 | Weiss et al. | |
| 5,485,600 A | 1/1996 | Joseph et al. | |
| 5,485,620 A | 1/1996 | Sadre et al. | |
| 5,509,116 A | 4/1996 | Hiraga et al. | |
| 5,530,643 A | 6/1996 | Hodorowski | |
| 5,539,906 A | 7/1996 | Abraham et al. | |
| 5,546,301 A | 8/1996 | Agrawal et al. | |
| 5,553,237 A | 9/1996 | Eisenberg et al. | |
| 5,555,385 A | 9/1996 | Osisek | |
| 5,576,946 A | 11/1996 | Bender et al. | |
| 5,594,858 A | 1/1997 | Blevins | |
| 5,602,993 A | 2/1997 | Stromberg et al. | |
| 5,603,018 A | 2/1997 | Terada et al. | |
| 5,611,059 A | 3/1997 | Benton et al. | |
| 5,631,825 A | 5/1997 | van Weele et al. | |
| 5,649,200 A | 7/1997 | Leblang et al. | |
| 5,768,119 A | 6/1998 | Havekost et al. | |
| 5,812,394 A | 9/1998 | Lewis et al. | |
| 5,838,563 A | 11/1998 | Dove et al. | |
| 5,864,657 A | 1/1999 | Stiffler | |
| 5,903,897 A | 5/1999 | Carrier, III et al. | |
| 5,940,294 A | 8/1999 | Dove | |
| 5,950,209 A | 9/1999 | Carrier, III et al. | |
| 5,984,504 A | 11/1999 | Doyle et al. | |
| 6,047,129 A | 4/2000 | Frye | |
| 6,078,320 A | 6/2000 | Dove et al. | |
| 6,138,174 A | 10/2000 | Keeley | |
| 6,157,864 A | 12/2000 | Schwenke et al. | |
| 6,161,051 A | 12/2000 | Hafemann et al. | |
| 6,167,316 A | 12/2000 | Gloudeman et al. | |
| 6,272,386 B1* | 8/2001 | McLaughlin et al. | 700/82 |
| 6,314,425 B1 | 11/2001 | Serbinis et al. | |
| 6,381,698 B1 | 4/2002 | Devanbu et al. | |
| 6,385,494 B1 | 5/2002 | Blahnik et al. | |
| 6,385,496 B1 | 5/2002 | Irwin et al. | |
| 6,415,418 B1 | 7/2002 | McLaughlin et al. | |
| 6,434,157 B1* | 8/2002 | Dube' et al. | 370/401 |
| 6,438,432 B1 | 8/2002 | Zimmermann et al. | |
| 6,442,512 B1 | 8/2002 | Sengupta et al. | |
| 6,442,515 B1 | 8/2002 | Varma et al. | |
| 6,445,963 B1 | 9/2002 | Blevins et al. | |
| 6,446,202 B1 | 9/2002 | Krivoshein et al. | |
| 6,449,624 B1 | 9/2002 | Hammack et al. | |
| 6,449,715 B1 | 9/2002 | Krivoshein | |
| 6,477,435 B1 | 11/2002 | Ryan et al. | |
| 6,515,683 B1 | 2/2003 | Wright | |
| 6,546,297 B1 | 4/2003 | Gaston et al. | |
| 6,587,108 B1 | 7/2003 | Guerlain et al. | |
| 6,631,476 B1 | 10/2003 | Vandesteeg et al. | |
| 6,647,301 B1 | 11/2003 | Sederlund et al. | |
| 6,647,315 B1 | 11/2003 | Sherriff et al. | |
| 6,684,385 B1 | 1/2004 | Bailey et al. | |
| 6,775,707 B1 | 8/2004 | Bennett et al. | |
| 6,832,343 B2 | 12/2004 | Rupp et al. | |
| 6,915,444 B2 | 7/2005 | Vasko et al. | |
| 6,928,328 B2 | 8/2005 | Deitz et al. | |
| 6,975,966 B2 | 12/2005 | Scott et al. | |
| 6,999,824 B2 | 2/2006 | Glanzer et al. | |
| 7,069,580 B1 | 6/2006 | Deitz et al. | |
| 7,076,312 B2 | 7/2006 | Law et al. | |
| 7,107,358 B2* | 9/2006 | Vasko et al. | 709/249 |
| 7,165,210 B2* | 1/2007 | Nieminen | 714/792 |
| 7,237,109 B2 | 6/2007 | Scott et al. | |
| 7,289,861 B2* | 10/2007 | Aneweer et al. | 700/110 |
| 2002/0013629 A1* | 1/2002 | Nixon et al. | 700/4 |
| 2002/0083364 A1* | 6/2002 | Christensen et al. | 714/13 |
| 2002/0138668 A1 | 9/2002 | Heckel | |
| 2003/0014536 A1 | 1/2003 | Christensen et al. | |
| 2003/0051053 A1* | 3/2003 | Vasko et al. | 709/246 |
| 2004/0019393 A1* | 1/2004 | Heider et al. | 700/31 |
| 2004/0059917 A1 | 3/2004 | Powers | |
| 2004/0210326 A1 | 10/2004 | Muneta et al. | |
| 2005/0085928 A1* | 4/2005 | Shani | 700/18 |
| 2005/0086537 A1* | 4/2005 | Johnson | 713/201 |
| 2007/0293984 A1* | 12/2007 | Lin et al. | 700/245 |

FOREIGN PATENT DOCUMENTS

| | | |
|---|---|---|
| DE | 102 47 520 | 4/2004 |
| EP | 0 276 937 | 8/1988 |
| EP | 0 472 169 | 2/1992 |
| EP | 0 813 129 | 5/1998 |
| EP | 1 091 274 | 4/2001 |
| EP | 1 396 772 | 3/2004 |
| GB | 2 275 813 | 9/1994 |
| GB | 2 355 082 | 4/2001 |
| GB | 2 363 872 | 1/2002 |
| GB | 2 377 070 | 12/2002 |
| GB | 2 379 749 | 3/2003 |
| JP | 2001-202323 A | 7/2001 |
| JP | 2001-202324 A | 7/2001 |
| JP | 2001-242906 A | 9/2001 |
| JP | 2002-099512 A | 4/2002 |
| JP | 2003-505984 T | 2/2003 |
| WO | WO-97/49018 | 12/1997 |
| WO | WO-01/14940 | 3/2001 |
| WO | WO-01/46765 | 6/2001 |
| WO | WO-01/90829 | 11/2001 |
| WO | WO-02/097543 | 12/2002 |
| WO | WO-2004/057430 | 7/2004 |

OTHER PUBLICATIONS

Ames et al., "Applications of Web-Based Workflow," System Sciences, 79-87 (1998).
Bailey, "Introducing Bailey Evolution 90TM . . . The Sound Investment Strategy for Process Automation," 1993.
Bailey, "Wide-Range, Fully Compatible Family of Process Automation and Management Systems," 1993.
Chan et al., "Software Configuration Management Tools," Software Technology and Engineering Practice, 238-250 (1997).
Computer Products, "Unbundling the DCS", approximately 1992.
Elsag Bailey, "Elsag Bailey Automation", approximately 1993.
Fisher-Rosemount, "Managing the Process Better," Dec. 1993.
Fisher-Rosemount, "Managing the Process Better," Sep. 1993.
Honeywell, "Process Manager Specification and Technical Data," Sep. 1991.
Honeywell, "TDC 3000 Overview", approximately 1992.
Honeywell, "TDC 3000 Process Manager", approximately 1992.
Honeywell, "UDC 6000 Process Controller", Aug. 1992.
Leeds and Northrup, "Make Your Automation Plan a Reality: MAX 1000", approximately 1990.
Merant, "Change Management Capabilities," PVCS Dimensions [On-line] Available: http://nsit.uchicago.edu/rpa/documents/configuration/Merant/change_mgnt_capabilities.pdf (2005).
Reliance Electric Company, "Multitasking Capability Simplifies Process Control Design", approximately late 1980's by Angelo J. Notte.
Toshiba, "Toshiba Integrated Control Systems", Nov. 1990.
Notice of Rejection for Japanese Application No. 2004-018854, dated Nov. 4, 2009.

\* cited by examiner

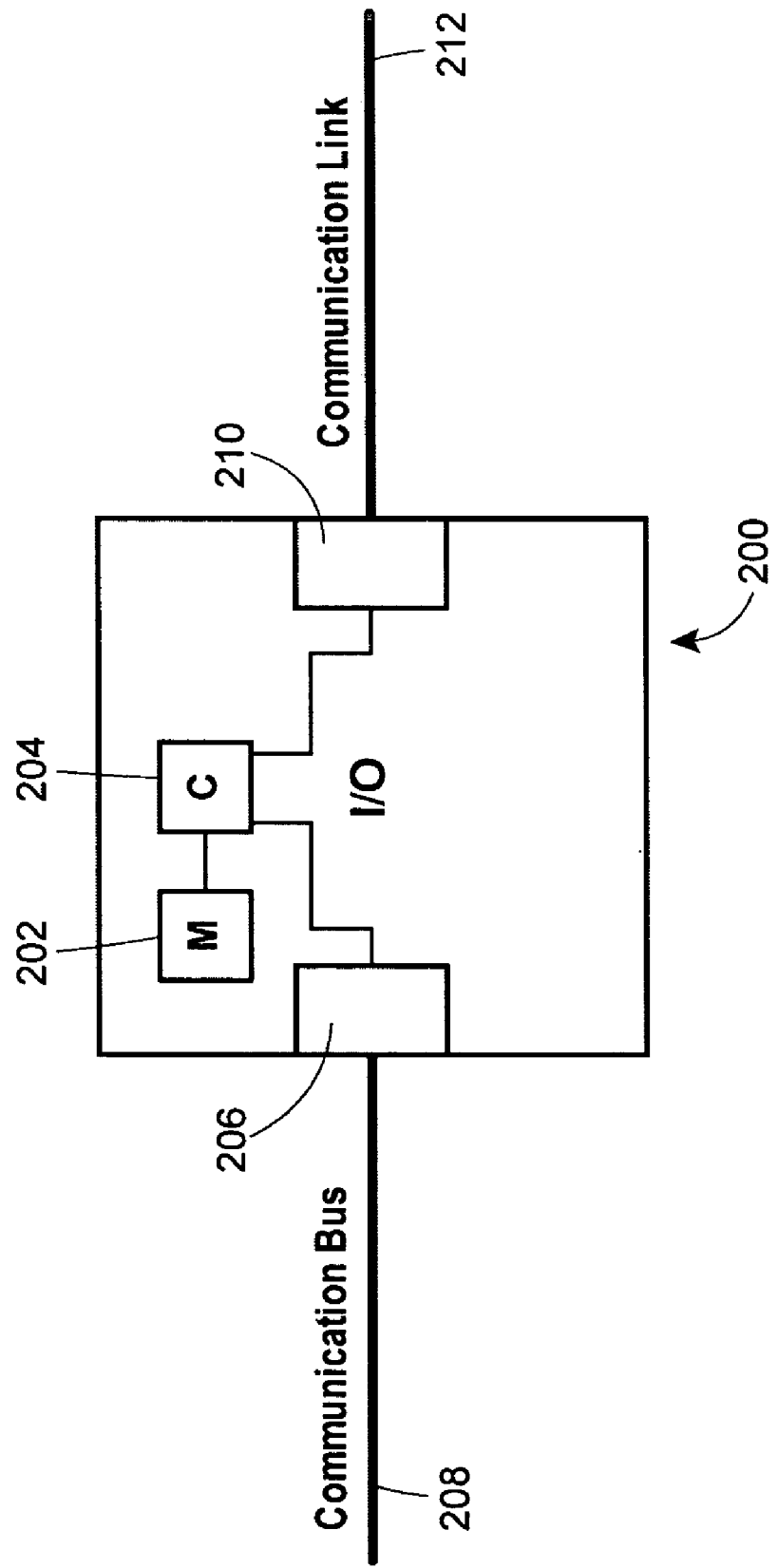

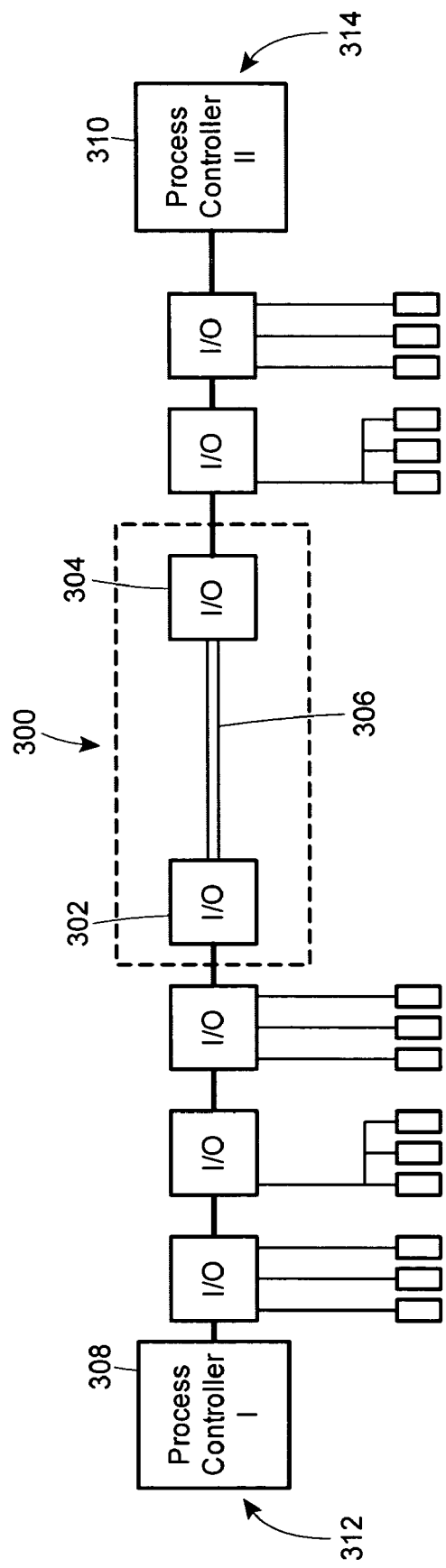

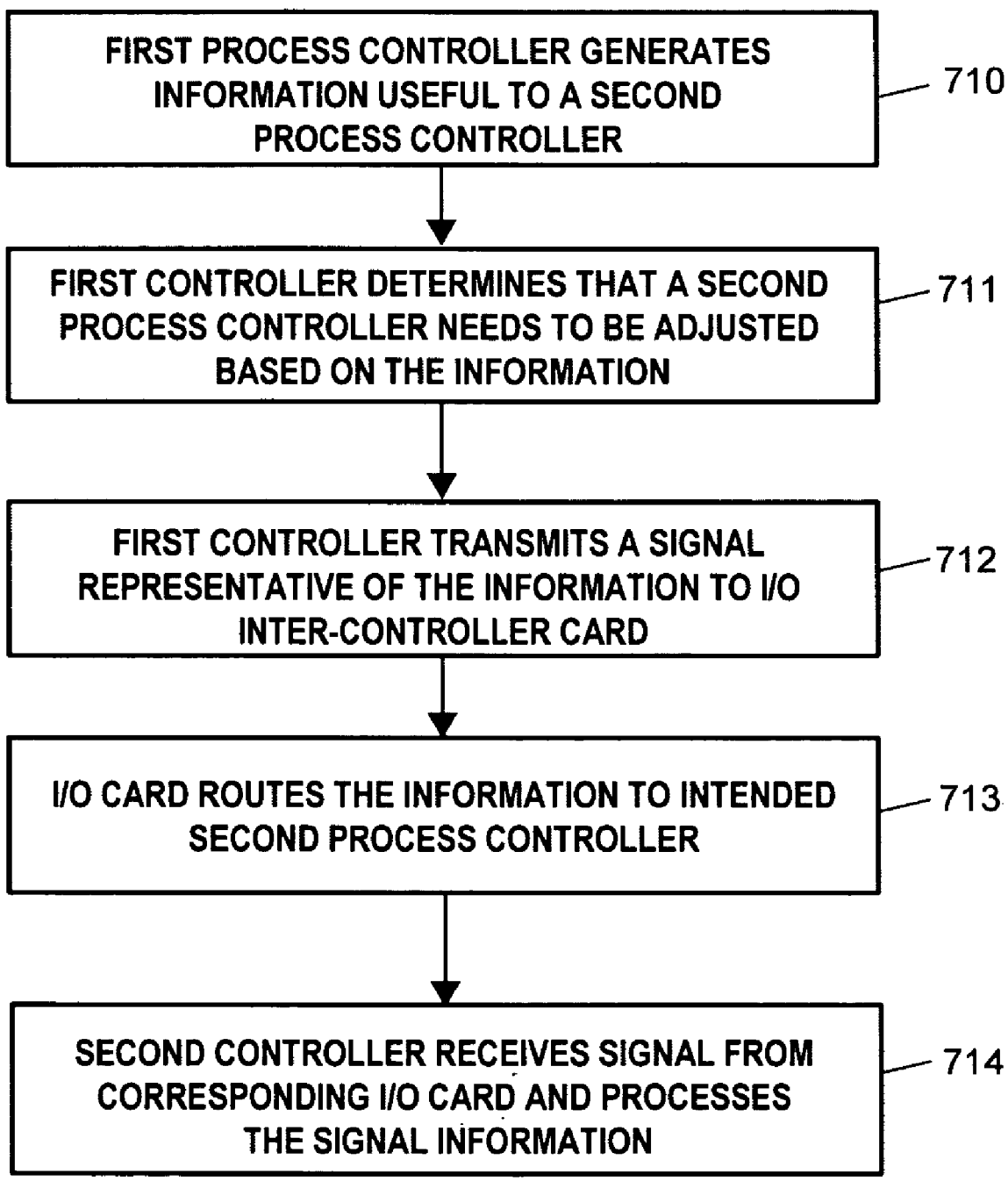

METHOD FOR INTERCONTROLLER COMMUNICATIONS IN A SAFETY INSTRUMENTED SYSTEM OR A PROCESS CONTROL SYSTEM

This is a continuation-in-part of U.S. application Ser. No. 10/352,396, filed Jan. 28, 2003, the entire disclosure of which is incorporated herein by reference.

FIELD OF TECHNOLOGY

The present invention relates generally to process control systems of a process plant that use an input/output (I/O) device to provide inter-controller communications.

DESCRIPTION OF THE RELATED ART

Process control systems, like those used in chemical, petroleum or other processes, typically include one or more process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

In some process systems, a separate safety system may be provided to detect significant safety related problems within the process plant and to automatically close valves, remove power from devices, switch flows within the plant, etc. when a problem occurs which might result in or lead to a serious hazard in the plant, such as a spill of toxic chemicals, an explosion, etc. These safety systems typically include one or more separate input/output (I/O) devices that have controllers, apart from the process control controllers, which are connected to safety field devices via separate buses or communication lines disposed within the process plant. The safety controllers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event is detected, the safety controller takes some action to limit the detrimental effect of the event, such as closing valves, turning devices off, removing power from sections of the plant, etc.

Some process controllers and/or safety controllers may be completely separated from one another. This separation may be a product of process control design where these controllers are generally designed to operate independently of each other. However, some situations may arise that require separated process controllers to communicate with one another, for example, when a process under the control of the two or more process controllers requires coordination between the two or more process controllers. While some systems may provide some intercommunication between controllers, this intercommunication may be inefficient because it utilizes controller resources that would otherwise be used for control functionality. Moreover, even in a process control system where the communication may be sent without using a workstation, the communication may be limited to a primary communication network that is better suited for higher level communication functions, not inter-controller communication. In other embodiments the communications may be performed by a dedicated communication processor that is essentially a co-processor of the controller. Special configuration may be required to send information to the communications co-processor, and to receive information from the communications co-processor to implement a control scheme. Thus, existing systems may have an inefficient or a non-existent inter-controller communication process.

SUMMARY OF THE DISCLOSURE

A process control system including a first process control system controller communicatively coupled to a first communication bus and second process control system controller communicatively coupled to a second communication bus are provided with an intercommunication connection via a system of I/O inter-controller devices. In one embodiment, a first I/O inter-controller card is connected between the first communication bus and a communication link, and a second I/O inter-controller card is connected between the second communication bus and the communication link. Controller signals may then be sent from the first process control system controller to the second process control system controller by simply addressing messages to the first I/O inter-controller card, and vice versa. The application programmer or configurer therefore treats these communications in the same manner as addressing an I/O channel on an I/O card. For example, sending a message may be exactly the same as driving an output channel, and, similarly, receiving a message may be exactly the same as reading an input channel. In one embodiment, safety messages that need to be communicated between nodes separately from process control signals may use a message propagation device, separate from the I/O inter-controller devices, to communicate safety messages between I/O safety devices. In another embodiment, safety messages that need to be communicated between nodes separately from process control signals may use a message propagation device, in addition to the I/O inter-controller devices, to communicate safety messages between I/O safety devices. In this embodiment the I/O inter-controller devices may be used to communicate over longer distances or between separate systems for overall plant interlocks, whereas the message propagation devices may only be used to communicate within a system.

In one embodiment, the first and the second process control system controllers may be connected to a primary communication network (separate from the communication link), in which one or more operator workstations or host computers may also be connected. Software within the operator workstations may communicate with, configure and view the operation of both the process controllers (and related process control field devices) and the safety controllers (and related safety field devices) via the primary communication network. In this embodiment, the I/O inter-controller devices provide inter-controller communication without using the primary communication network. In a further embodiment, the process controllers may be programmed to bypass the use of the primary communication network and limit all inter-controller communication to the communication buses coupled to the process controllers.

BRIEF DESCRIPTION OF THE DRAWINGS

FIG. 2 illustrates an I/O inter-controller card or device that may be used to provide a more efficient method for inter-controller communication;

FIG. 3 illustrates a dual I/O inter-controller system 300 that provides inter-controller communication using two of the I/O cards of FIG. 2.

FIG. 7B illustrates a block diagram of controller signal flow.

DETAILED DESCRIPTION

Figure 1:
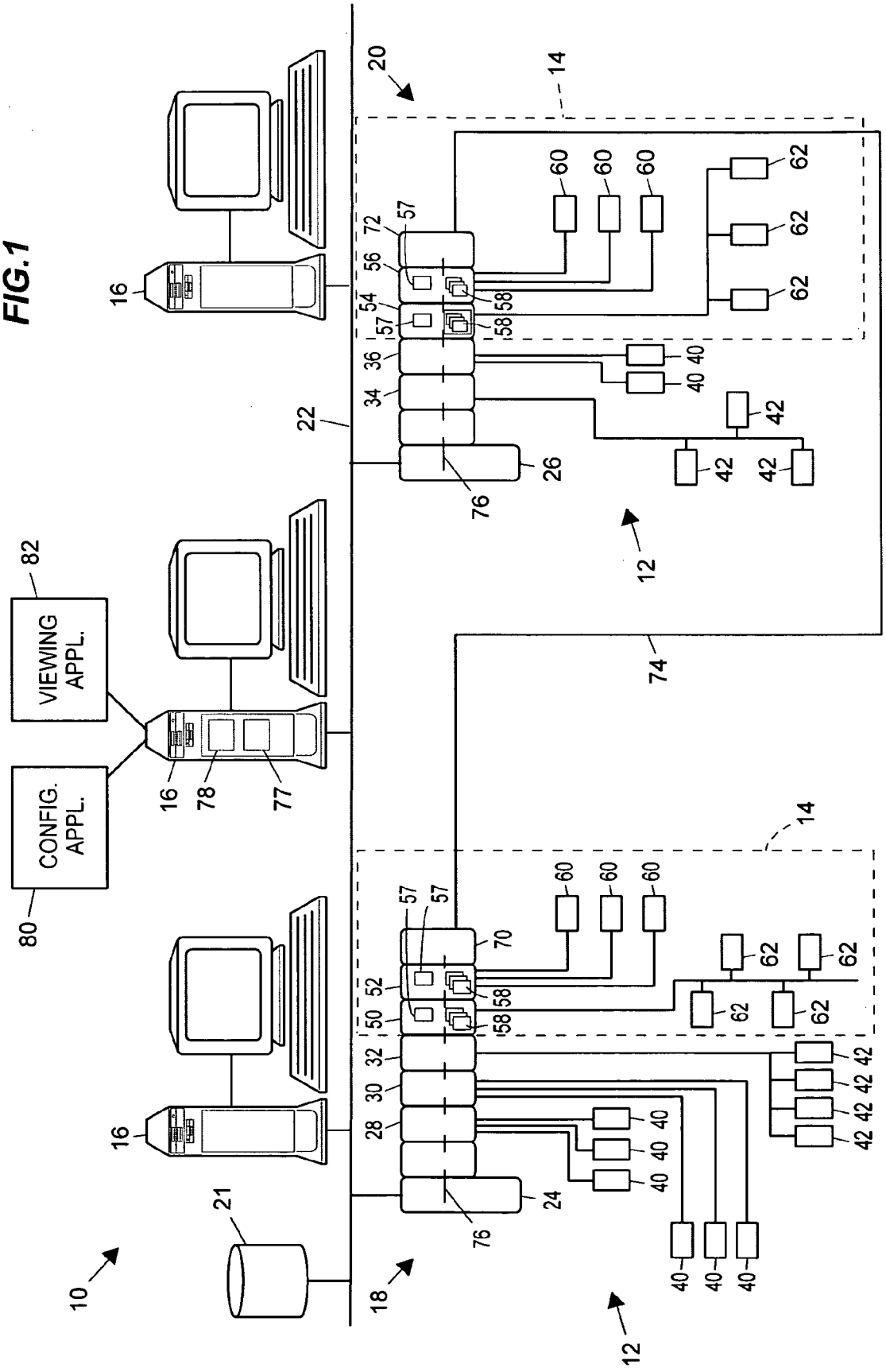
FIG. 1 illustrates a block diagram of an exemplary process plant having a safety system integrated with a process control system.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

In some existing systems, raw I/O data may only be communicated between devices on the same communication bus as the I/O devices producing the raw data. While process controllers connected on the bus may communicate information derived from the I/O devices via a primary communication network (separate from the communication bus), the information from the process controllers is generally processed, or altered, versions of the raw I/O data. Operator workstations may benefit from the processed I/O data (as opposed to the raw I/O data) because the processed data may represent simplified or enhanced data that is more suitable for monitoring functions than is raw data. Thus, in some systems, the process controllers may be configured to only communicate processed data over the primary communication network.

Moreover, in existing systems in which safety instrumented devices are existent, the data streams between safety related devices may be processed data streams, not raw I/O data streams. One reason for this is that the safety related devices may be designed to communicate with each other using pre-calculated data values (based on the raw data) to speed up safety related recognition processes. For example, the pre-processing of communication information may enable a receiving device to more quickly determine a time critical event, thereby allowing the safety system processor to react faster to the situation (e.g., by initiating a shut down or other safety action).

Furthermore, in some existing systems, communications between safety related devices and operator workstations may operate only through the process controllers. In these systems, monitoring of safety information by an operator is only needed on a sampled, or periodic basis. Therefore, the process controllers generally operate to provide filtered (or sampled), as well as processed, versions of the raw I/O data. When attempting to extract the raw safety I/O data from the processed and filtered data, errors may occur as well as time delays.

While there are advantages to using processed data, inter-controller communication may require raw I/O data, as opposed to the processed data communicated to a workstation. This may be the case when the inter-controller communication is used by a first process controller to generate control signals in coordination with a second process controller. In this case, the process controllers may need to use raw I/O data, not processed data. Also, in time critical operations, direct communication of raw I/O data may be inherently faster because the time necessary to create processed data by a first controller and the time needed to extract the raw data from the processed data by a second controller may be eliminated or reduced. Similarly, for safety related functions, raw safety I/O data may need to be expediently communicated between safety devices on different nodes or communication busses.

The claimed method and system provides for the communication of raw, unprocessed I/O data between process controllers and/or safety controllers.

Referring now to FIG. 1, a process plant 10 includes a process control system 12 integrated with a safety system 14 (indicated by dotted lines), which generally operates as a Safety Instrumented System (SIS) to monitor and override the control provided by the process control system 12 to maximize the likely safe operation of the process plant 10. The process plant 10 also includes one or more host workstations, computers or user interfaces 16 (which may be any type of personal computers, workstations, etc.) which are accessible by plant personnel, such as process control operators, maintenance personnel, configuration engineers, etc. In the example illustrated in FIG. 1, three user interfaces 16 are shown as being connected to two separate process control/ safety control nodes 18 and 20 and to a configuration database 21 via a common communication line or bus 22. The primary communication network 22 may be implemented using any desired bus-based or non-bus based hardware, using any desired hardwired or wireless communication structure and using any desired or suitable communication protocol, such as an Ethernet protocol.

Generally speaking, each of the nodes 18 and 20 of the process plant 10 includes both process control system devices and safety system devices connected together via a bus structure that may be provided on a backplane into which the different devices are attached. Each of nodes 18 and 20 may be located in different areas of the plant or control different equipment. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28-36 and the controller field devices 40 and 42 generally make up the process control system 12 of FIG. 1.

Likewise, the node 18 includes one or more safety system logic solvers 50, 52, while the node 20 includes safety system logic solvers 54 and 56. Each of the logic solvers 50-56 is an I/O device having a processor 57 that executes safety logic modules 58 stored in a memory and is communicatively connected to provide control signals to and/or receive signals from safety system field devices 60 and 62. Additionally, each of the nodes 18 and 20 includes at least one message propagation device (MPD) 70 or 72, which are communicatively coupled to each other via a ring type bus connection 74. The safety system logic solvers 50-56, the safety system field devices 60 and 62, the MPDs 70 and 72 and the bus 74 generally make up the safety system 14 of FIG. 1.

The process controllers 24 and 26, which may be, by way of example only, DeltaV™ controllers sold by Fisher-Rosemount Systems, Inc., an Emerson Process Management company, or any other desired type of process controllers programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines stored therein or otherwise associated therewith and communicates with the field devices 40 and 42 and the workstations 14 to control the process 10 or a portion of the process 10 in any desired manner. The process controllers 24 and 26 may generate device control signals that are sent to their respective I/O devices via communication line 76, where the I/O devices communicate with their respective field devices to affect a physical process characteristic or parameter. The process controllers 24 and 26 may also receive process parameter measurement signals from their respective field devices over the communication buses 76. The process controllers 24 and 26 may also pass along process parameter measurement signals to other field devices or I/O devices on its bus or transmit these process parameter measurement signals to an operator workstation 16 for monitoring or further processing at the workstation. The process controllers 24 and 26 may also receive (from I/O devices or workstations), generate, or transmit (to I/O devices or workstations) event signals and/or alarm signals that are associated with a detected condition of the process control system.

The field devices 40 and 42 may be any desired type of field devices, such as sensors, valves, transmitters, positioners, etc., and may conform to any desired open, proprietary or other communication or programming protocol including, for example, the HART or the 4-20 ma protocol (as illustrated for the field devices 40), any fieldbus protocol such as the Foundation Fieldbus protocol (as illustrated for the field devices 42), or the CAN, Profibus, the AS-Interface protocols, to name but a few. Similarly, the I/O devices 28-36 may be any known type of process control I/O devices using any appropriate communication protocol(s).

The safety logic solvers 50-56 of FIG. 1 may be any desired type of safety system control devices that include a processor 57 and a memory that stores safety logic modules 58 adapted to be executed on the processor 57 to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol.

A common backplane 76 (indicated by a dotted line through the controllers 24, 26, the I/O devices 28-36, the safety logic solvers 50-56 and the MPDs 70 and 72) is used in each of the nodes 18 and 20 to connect the controllers 24 and 26 to the process control I/O cards 28, 30 and 32 or 34 and 36, as well as to the safety logic solvers 52, 54 or 56 and 58 and to the MPDs 70 or 72. The controllers 24 and 26 are also communicatively coupled to, and operate as a bus arbitrator for the bus 22, to enable each of the I/O devices 28-36, the logic solvers 52-56 and the MPDs 70 and 72 to communicate with any of the workstations 16 via the bus 22.

As will be understood, each of the workstations 16 includes a processor 77 and a memory 78 that stores one or more configuration and/or viewing applications adapted to be executed on the processor 78. A configuration application 80 and a viewing application 82 are illustrated in an exploded view in FIG. 1 as being stored in one of the workstations 14. However, if desired, these applications could be stored and executed in different ones of the workstations 14 or in other computers associated with the process plant 10. Generally speaking, the configuration application 80 provides configuration information to a configuration engineer and enables the configuration engineer to configure some or all elements of the process plant 10 and to store that configuration in the configuration database 21. As part of the configuration activities performed by the configuration application 80, the configuration engineer may create control routines or control modules for the process controllers 24 and 26, may create safety logic modules for any and all of the safety logic solvers 50-56 and may download these different control and safety modules to the appropriate ones of the process controllers 24 and 26 and the safety logic solvers 50-56 via the bus 22 and controllers 24 and 26. Similarly, the configuration application 80 may be used to create and download other programs and logic to the I/O devices 28-36, any of the field devices 40, 42, 60 and 62, etc.

Conversely, the viewing application 82 may be used to provide one or more displays to a user, such as to a process control operator, a safety operator, etc., which includes information about the state of the process control system 12 and the safety system 14 either in separate views or in the same view, if so desired. For example, the viewing application 82 may be an alarm display application that receives and displays indications of alarms to an operator.

In any event, the applications 80 and 82 may send separate configuration and other signals to and may receive data from each of the process controllers 24 and 26 as well as from each of the safety system logic solvers 50-56. These signals may include process-level messages related to controlling the operational parameters of the process field devices 40 and 42, and may include safety-level messages related to controlling the operational parameters of the safety-related field devices 60 and 62. While the safety logic solvers 50-56 may be programmed to recognize both the process-level messages and the safety-level messages, the safety logic solvers 50-56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices.

If desired, the safety logic solvers 50-56 may employ the same or a different hardware or software design as compared to the hardware and software design used for the process control I/O cards 28-36. However, the use of alternate technologies for the devices within the process control system 12 and devices within the safety system 14 may minimize or eliminate common cause hardware or software failures.

The use of the backplane 76 in each of the nodes 18 and 20 enables the safety logic solvers 50 and 52 and the safety logic solvers 54 and 56 to communicate locally with one another to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate areas or nodes of the plant 10. In other words, the use of the MPDs 70 and 72 and the bus 74 enables a configuration engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

As discussed above, a process controller may be responsible for the operation of a set of field devices on a node, where the node may include a process controller coupled to a bus having a plurality of I/O devices and field devices connected to the I/O devices. The I/O devices may be configured by the workstations to perform process control functions involving only the devices on the node. These process control functions may be executed independently of other process controllers. However, there are times when coordination and/or communication may be required between two or more sets of field devices under the control of two or more process controllers. In other words, coordination or communication may be needed between two or more process controllers on separate nodes. In some systems, this communication between two or more process controllers (which may be disposed on nodes in different areas of a plant or nodes that control different equipment) may be accomplished by using the workstation as an arbiter between the two or more process controllers. For example, when a first controller of a first node needs to communicate a signal to a second process controller on a second node, the process controller may be programmed to send the signal to a workstation. The workstation may process the signal, using a running program, and determine that it needs to forward the signal or create a second signal to direct the second process controller accordingly. This indirect communication, however, requires additional programming at the workstation level to operate. This method of inter-controller communication may be dependent on a central workstation(s) to act as a proxy or as a central processor to facilitate cooperation between two process controllers or nodes. Furthermore, in distributed process control system environments, where advantages depend on the ability to redistribute control functions away from a central computer, this method of arbitration may diminish the benefits of the distribution design.

An alternative method of inter-controller communications may be provided by programming the process controllers to use a primary communication network, such as the communication network that couples the process controllers to a workstation, to deliver and receive signals between the process controllers without involving the workstations as arbiters. Effectively, this may provide an advantage over a method of using a workstation to process the inter-controller communications by reducing the role of the workstation. However, the primary communication line is generally designed and reserved for communication between process controllers and workstations. For example, the primary communication lines may play a role in configuring the process controllers and receiving and monitoring process control activities as well as safety control signals. In essence, process control functionality is generally intended to be executed at and isolated to the node level, using communication buses and I/O devices connected to field devices. In situations where there is a high level of inter-controller communication required, the primary communication line may be overwhelmed with inter-controller communication traffic, resulting in degradation of monitoring and programming functionality. Again, this may reduce the advantages of the designed distribution of functionality.

FIG. 2 illustrates an I/O inter-controller card 200 or device that may be used to provide an efficient method for inter-controller communication. The I/O inter-controller card may have a memory 202 for storing communications instructions and a controller 204 for executing those instructions to provide inter-controller functionality. The I/O inter-controller card may include a first interface 206 for connecting to a communication bus 208 that communicates with, for example, a process controller. The I/O inter-controller card 200 may include a second interface 210 for connecting to a communication link 212 separate from the communication bus 208. Unlike I/O cards 28-36 (FIG. 1) that process communication between a bus 76 and field devices 40 and 42, or I/O cards 50-56 that process safety related communication with safety field devices 60-62, the I/O inter-controller card 200 may execute instructions to process communication from a process controller on the communication bus 208 and the communication link 212. In one embodiment, the I/O inter-controller card 200 may be programmed to listen to and receive signals or messages directed to it from a process controller via the bus 208 using a first communication protocol. The I/O inter-controller card may then translate the received signal for transmission over a different communication protocol over the communication link 212.

FIG. 3 illustrates a dual I/O inter-controller system 300 that provides inter-controller communication using two of the I/O cards 200 of FIG. 2. I/O devices 302 and 304 may operate to enable portions of the process control system 12 that are disposed at vastly different locations or nodes of the plant 10 to still communicate with one another to provide coordinated process control functionality at different nodes (e.g., 18 and 20 of FIG. 1) of the process plant 10. In particular, the I/O devices 302 and 304 in conjunction with a communication link 306 may enable process controllers 308 and 310 associated with nodes 312 and 314 of a process plant to be communicatively connected together to allow for the integration of process-related functions between controllers within the process plant. Similar to the MPD functionality, two or more process control-related functions at different locations within the process plant may be interlocked or interconnected without having to run a dedicated line to individual process controllers within the separate areas or nodes of the plant. In other words, the use of I/Os 302 and 304 and communication link 306 may enable a configuration engineer to design and configure a process control system that is distributed throughout the process plant 10 but that has different components thereof communicatively interconnected to enable the disparate process control related hardware to communicate with each other as required. This feature also provides scalability of a process control system in that it enables combinations of equipment and devices within a process control routine to be designed without the need to physically restructure connections between devices and process controllers.

Figure 4A:
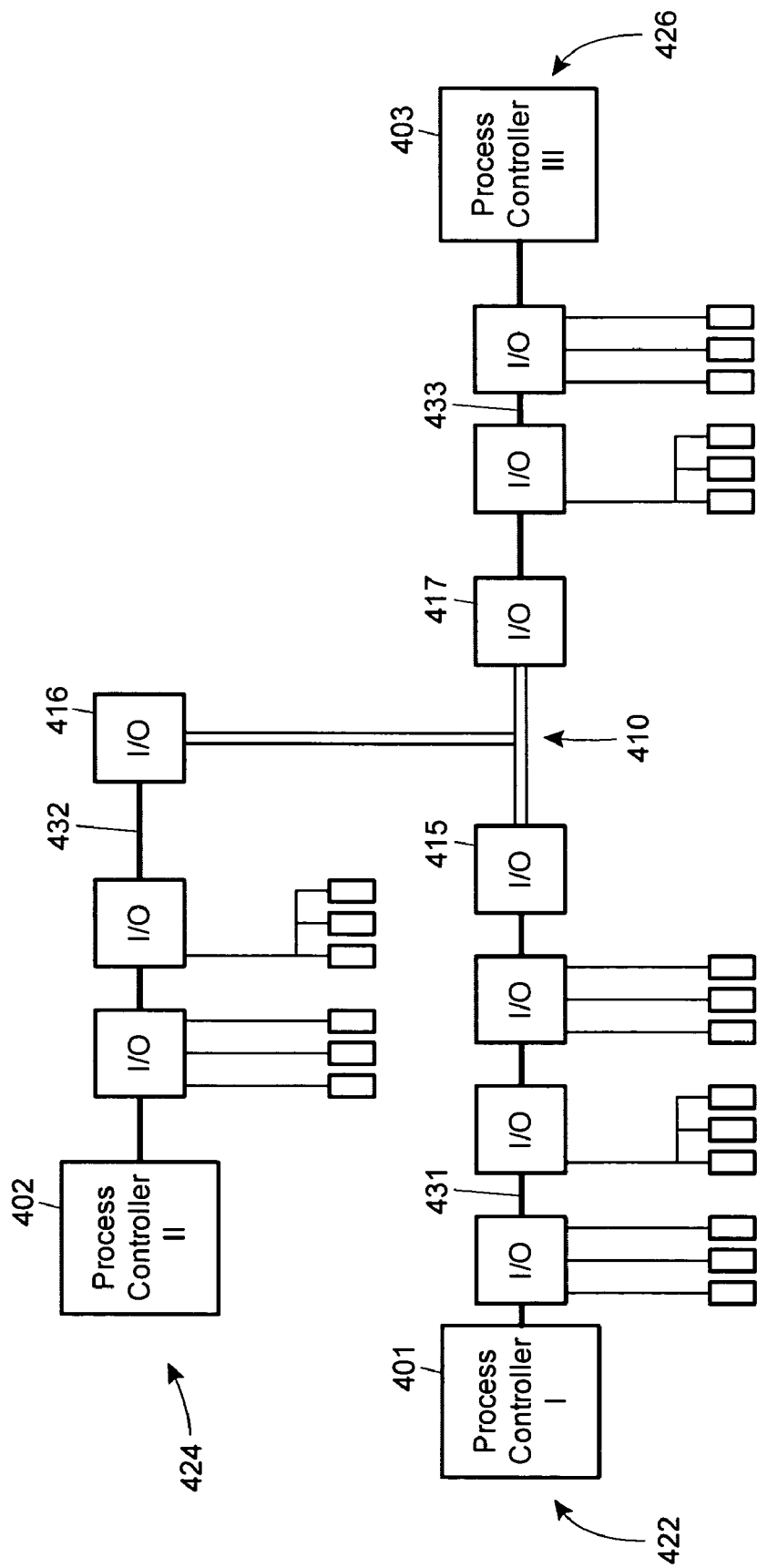
FIG. 4A illustrates using an I/O device per bus to provide inter-controller communication.

The embodiment of FIG. 4A illustrates an inter-controller communication embodiment in which a plurality of process controllers 401-403 may be interconnected to a single communication link 410 via a set of I/O inter-controller devices 415-417. In this configuration, a process controller 401 at a first node 422 may communicate with a process controller 402 at another node 424 by adding a single I/O inter-controller card 415 and 416 to each associated communication bus 431-432. Further, a third process controller 403 at a third node 426 may communicate with the first process controller 401 and second process controller 402 over the same communication link 410, by adding a single I/O card 417 to its communication bus 433. In this situation, the communication link 410 may represent a communication network running an Ethernet, Token Ring, FDDI, ARCNET, WiFi, serial or parallel communication protocol. The network may be internal to a company, such as an intranet, or may use the Internet (with appropriate security protocols).

Figure 4B:
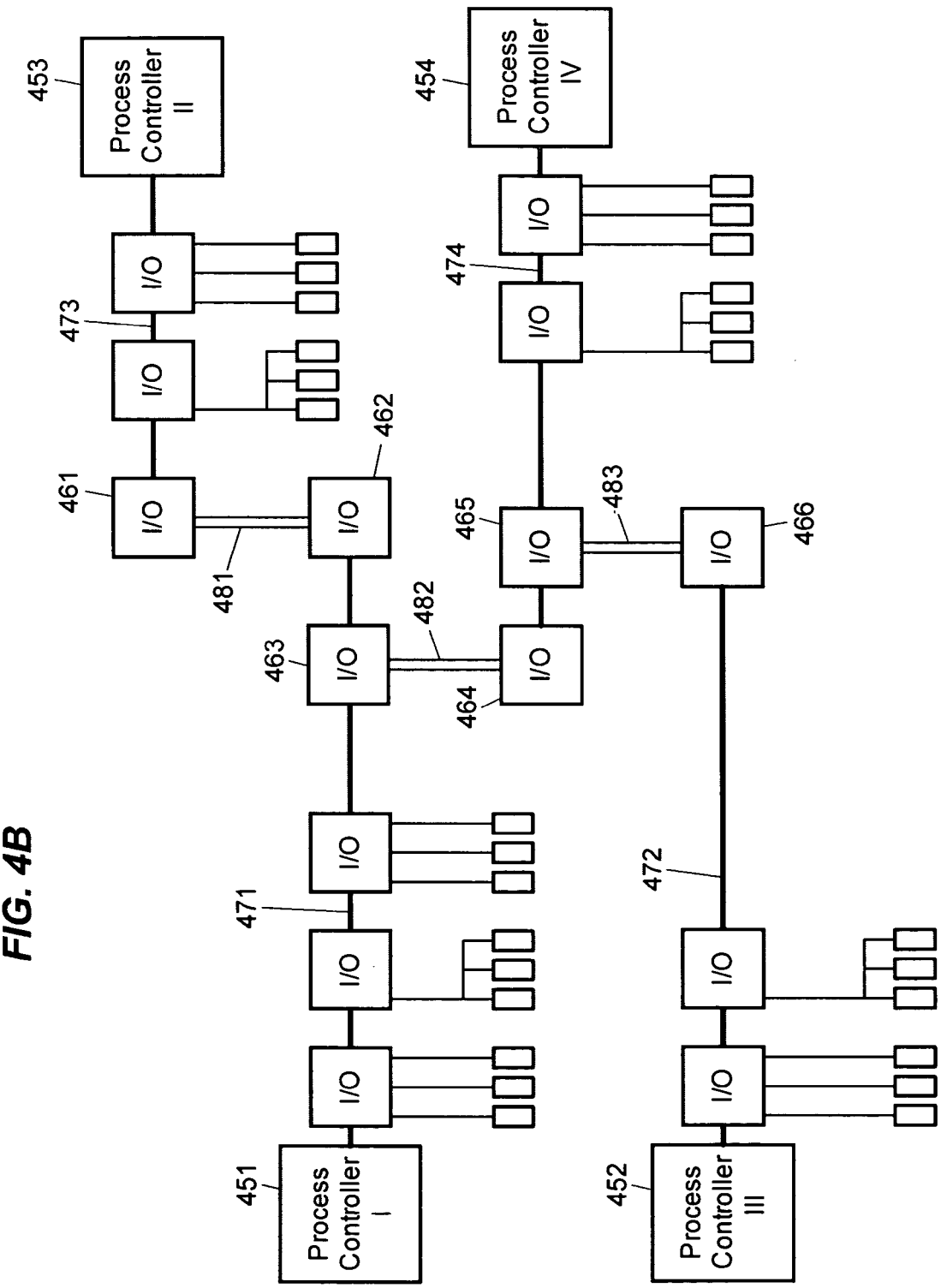
FIG. 4B illustrates using two I/O devices on a single communication bus to provide inter-controller communication between a plurality of process controllers.

FIG. 4B illustrates an alternative embodiment in which a process controller 451 may be interconnected to a plurality of process controllers 452-454 using multiple I/O inter-controller devices 461-466. Specifically, in this embodiment, a single communication bus 471 may use multiple I/O inter-controller cards 463 and 462. A first I/O inter-controller device 462 may be used to communicatively connect a first process controller 451 to a second process controller 453, while a second I/O device 463 may be used to connect the first process controller 451 to a third process controller 452. In this cascade configuration, each of the process controllers 451-454 may communicate with one another using multiple I/O cards 461-466 and multiple communication links 481-483, instead of a single I/O card per bus and a single communication link, or network, as illustrated in FIG. 4A. In the embodiment of FIG. 4B, the communication links 481-483 between the I/O inter-controller cards 461-466 may be communication busses that only provide signals between two nodes at a time. In this embodiment, a process controller such as 454 may facilitate inter-controller communication by simply passing along signals from one process controller, e.g., 451, to another process controller, e.g., 452.

Figure 5:
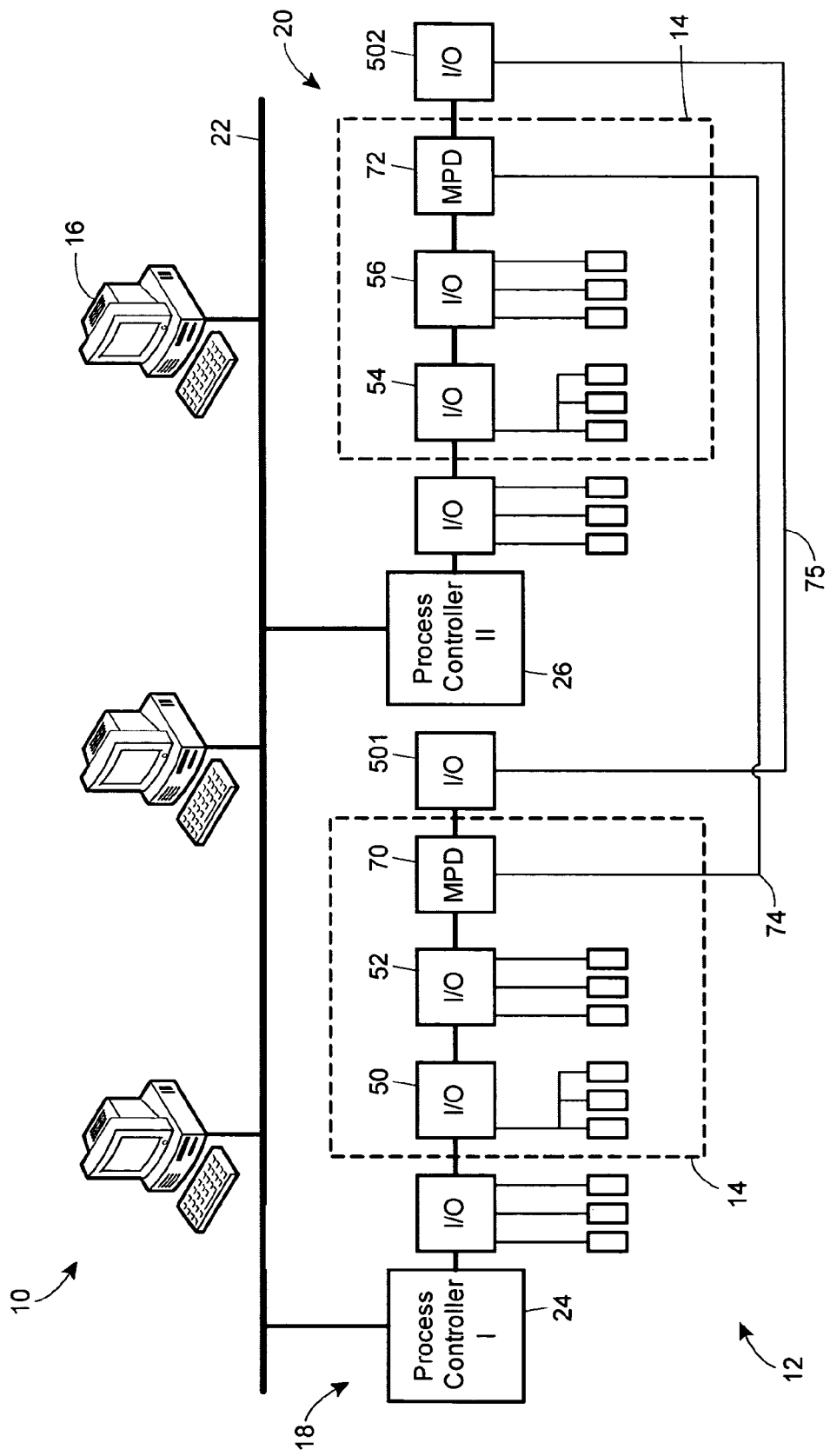
FIG. 5 illustrates the integrated safety and process control system of FIG. 1 using inter-controller I/O devices and message propagation devices (for intercommunication between safety components on different nodes)

FIG. 5, illustrates the process control system of FIG. 1 integrated with the I/O bridge system of FIG. 2. In this embodiment, MPDs 70 and 72 operate to provide communication between safety system logic solvers 50-52 and 54-56 via connection 74, while I/O inter-controller devices 501 and 502 operate to provide inter-controller communication between process controllers 24 and 26 via connection 75. As shown in FIG. 5, a primary communication network 22 may be used to communicate configuration data and monitoring data between the workstations 16 and the process controllers 24 and 26. While it may be possible to provide inter-controller communication over the primary communication network 22, this may be an inefficient communication method. Specifically, as discussed above, the primary communication network is intentionally reserved for monitoring and configuration functions. These functions are critical to process control configuration and monitory and usurping bandwidth on this primary communication network with inter-controller communication may negatively impact the configuration and monitoring functions. Moreover, inter-controller data may require a processing and extraction of raw data that delays communication. FIG. 5 illustrates a system in which inter-controller communication is provided using the existing infrastructure.

In one embodiment, the MPDs 70 and 72 may operate to communicate only processed data streams between the safety related devices connected thereto. In this embodiment, the inter-controller devices 501 and 502 may operate to communicate raw I/O data for safety related functions. For example, raw I/O data produced by the safety system logic solvers 50-56 may be communicated via the communication link 503 (separate from connection 74) via inter-controller devices 501 and 502. In one embodiment, the safety system logic solvers may directly address the I/O inter-controller devices 501 and 502 in the same manner as the process controllers 24 and 26. In an alternative embodiment, the raw I/O data from safety system logic solvers 50-56 may be first collected and/or received by one of process controllers 24 and 26, where the process controllers 24 and 26 manage the communication of the raw I/O data between devices on different nodes via the inter-controller devices 501 and 502.

In one embodiment, the process control system controllers may be programmed to detect whether an I/O inter-controller communication card or device is connected to the controller's bus. In this embodiment, the process controller may, if required, use the primary communication network to carry inter-controller communication with another process controller when there is no detected inter-controller I/O card. Alternatively, if the process controller detects a inter-controller I/O card, the process controller may instead use the I/O inter-controller communication card to process all inter-controller communication.

Figure 6:
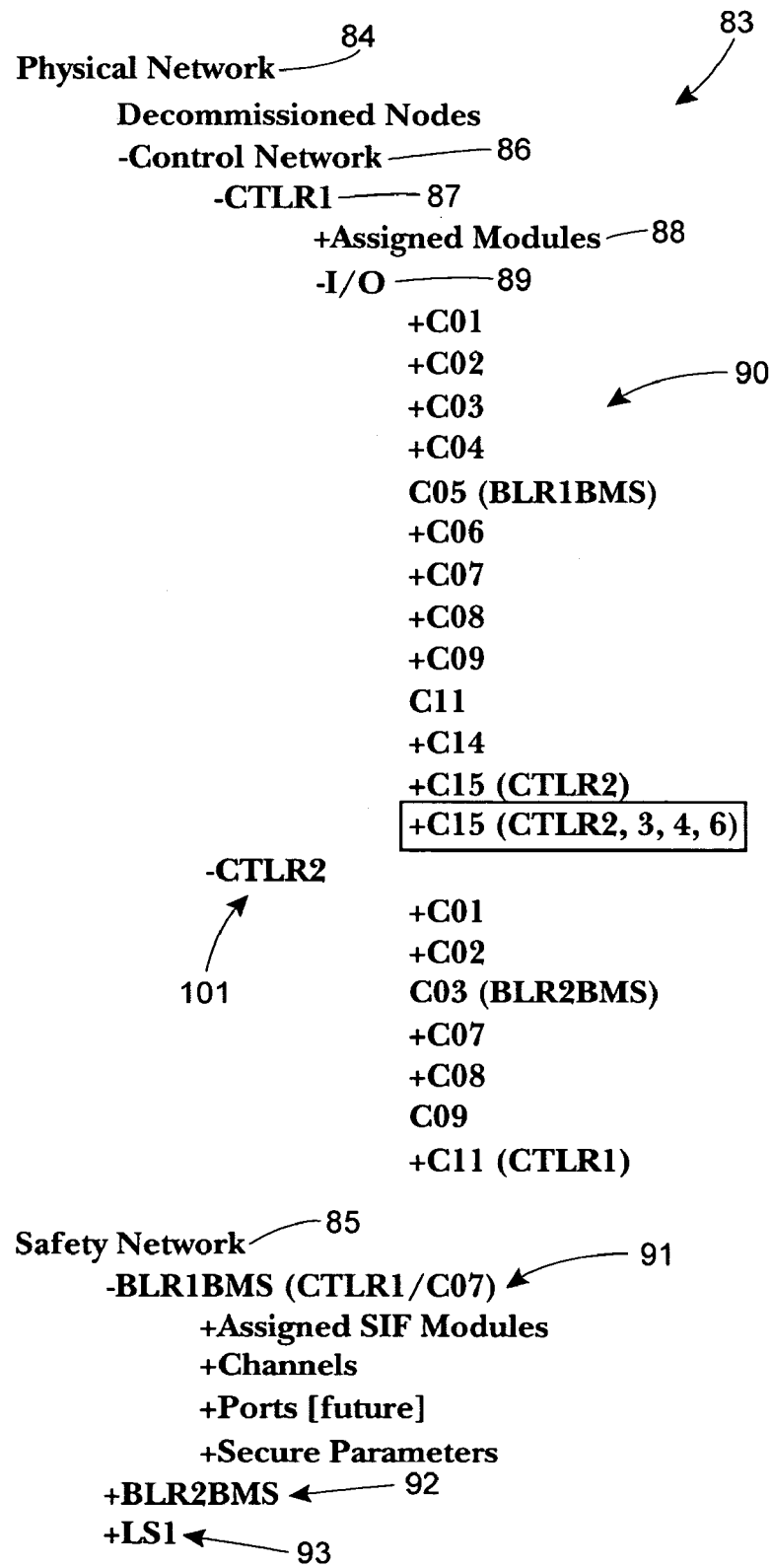
FIG. 6 illustrates a screen display generated by a configuration application in one of the workstations of FIG. 1 illustrating a configuration view of the process plant of FIG. 1 showing both process control system devices and safety system devices.

FIG. 6 illustrates a screen display 83 that may be generated by the configuration routine 80 of FIG. 1 depicting a configuration presentation having the safety system 14 (including the logic solvers and the safety field devices) integrated with the process control system 12 (including inter-controller I/O bridge devices). It will be understood that the configuration display screen 83 of FIG. 2 illustrates the manner in which the configuration application 80 has configured the software associated with the different devices within the process plant 10 and can be used by a configuration engineer to create or alter the current configuration of the process plant 10 by downloading new configuration software to the devices within the process plant 10, including the process control system devices and the safety system devices.

As illustrated in the screen display 83, the process plant 10 includes a physical network section 84 which is used for displaying the physical interconnections of the devices within the process plant 10 and a safety network section 85 which is used for configuring safety system devices. The physical network section 84 includes a control network section 86 having a controller 87 (named CTRLR1) and a controller 101 (named CTRLR2). The controller 87, which may be one of the controllers of FIG. 1, includes a set of assigned modules 88 which are control modules stored in and executed by the controller 87 and an I/O devices section 89 connected to the controller 87 for communication purposes. The I/O devices section 89 is expanded to illustrate all of the cards 90 connected to the controller 87 (CTLR1) via one of the backplanes 76 of FIG. 1. In this example, I/O devices section 89 includes process control input/output cards C01-C04, C06-C09 and C14. Each of these cards may be expanded to illustrate the identity of and other information associated with the different field devices (which are individual ones of the field devices 40 an 42 of FIG. 1) connected to each of these cards.

For illustration of the physical connections, an inter-controller card C15 (CTRLR2) is listed under CTRLR1 to indicate a link between controller 87 and controller 101 (i.e., CTRLR2). In a system having multiple inter-controller cards for connecting to multiple process controllers, the I/O devices section 89 may provide multiple I/O inter-controller card entries. Alternatively, in a system having a single inter-controller card connected to a network including multiple process controllers, the inter-controller card may be represented by a single card C023 (CTRLR2, 3, 4, 6, etc.) Similarly, two safety system cards C05 (named BLR1BMS) and C11 (not yet configured) are illustrated under controller 87. These cards cannot be expanded in this section (represented by the lack of a + sign) because they cannot be configured in or by the control network. However, as will be understood, the devices associated with the process control system 12 can be configured using the control network section 86 of the screen 83 by adding, deleting, or changing control modules, I/O devices and/or field devices, to the configuration presentation.

The safety system 12 is illustrated in the safety network section 85 of the screen 83 as including three safety logic solvers 91-93 named BLR1BMS, BLR2BMS and LS1. Likewise, if desired, message propagation devices (such as the MPDs 70 and 72 of FIG. 1) may be illustrated in the safety network section 85. In the screen 83, the safety logic solver 91 is expanded to illustrate that it includes assigned safety modules, one or more channels (which are connected to safety field devices such as the devices 60 and 62 of FIG. 1) and secure parameters. Each of these elements could be further viewed, added to, deleted or changed in this section of the screen 83 to thereby configure the safety system 14. In particular, the safety system 14 can be configured and modified using the safety network section 85 in a manner similar to the manner of configuring the process control network 14 using the control network section 86. In fact, as will be understood, control or safety modules can be created and assigned to each of these different control and safety systems using the method for configuring a process control system as described in U.S. Pat. No. 5,838,563 which is assigned to the assignee of this patent and which is hereby expressly incorporated by reference herein.

FIG. 7 illustrates a signal processing path for an existing workstation-based inter-controller communication system. A control module being executed on a first process controller may generate information that is useful to a second process controller 701. The control module may then generate a first controller signal and transmit the first controller signal to an operator workstation 702. The first controller signal may be a process parameter measurement signal, a control signal, an alarm, and/or event. The operator workstation may be programmed to listen for and receive the first controller signal 703. The operator workstation program may determine that the information represented by the first controller signal requires a second controller to be notified or directed to perform an action 704. The operator workstation may then transmit a second signal to a second process controller 705, thereby providing, indirectly, inter-controller communication.

Figure 7A:
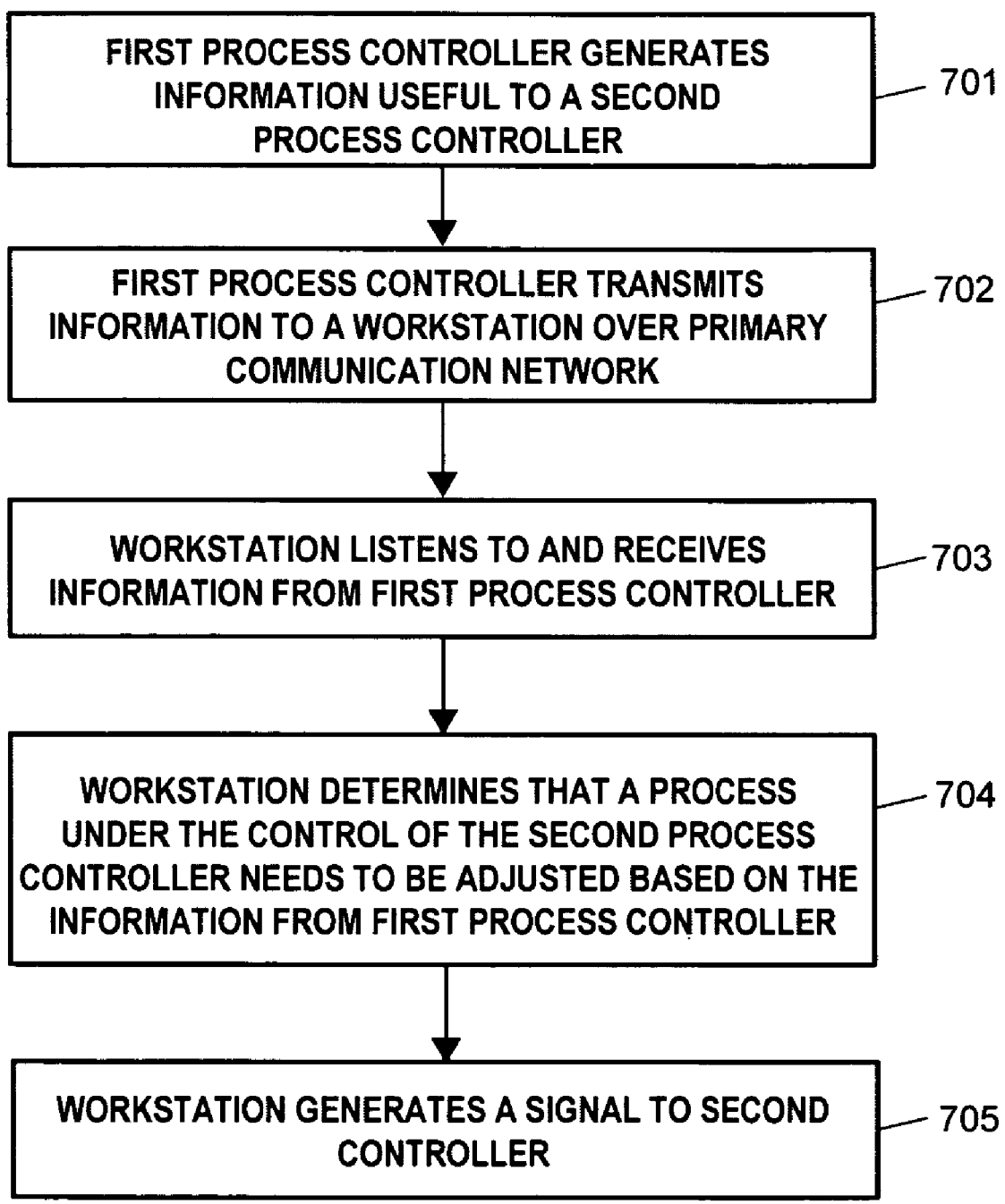
FIG. 7A illustrates a block diagram of an existing data flow between a process controller and a workstation.

In the claimed system, the I/O inter-controller cards may be used to reduce the need for a workstation to facilitate communication between two process controllers on different nodes, as previously illustrated in FIG. 7A. Instead of creating a control module that requires addressing a signal to a workstation (as in block 702), programming a workstation to process the signal (as in blocks 703 and 704), and directing a second process controller (as in block 705), the control module can be programmed to process a signal as illustrated in FIG. 7B.

FIG. 7B illustrates that the first controller may generate information useful to a second process controller 710. In 7B however, it is the first controller that determines that a second process needs to be directed to adjust a physical parameter 711. The first controller may then be programmed, via its control modules, to simply send a signal to an I/O inter-controller device without 712. The first controller does not need to include and further programming concerning the second processor. Because process controllers are generally programmed to communicate with I/O devices on the local communication bus, no additional programming is required to interface two or more process controllers. In one embodiment, a first process controller can simply address a message to an I/O inter-controller device on its communication bus, without regard to how the inter-controller device provides the interconnection. The inter-controller device may be programmed using its own memory and processor to listen to and receive messages on the local communication bus 713. In a situation in which only two process controllers are connected by respective I/O inter-controller devices, a first inter-controller card receiving a message addressed to it may be simply translate the received signal for transmission over a communication link to a second I/O controller, which then translates the message received from the communication link into a protocol appropriate for delivery on a second communication bus to a second process controller. The second process controller may receive the signal from the corresponding I/O inter-controller communication card on its bus and process the signal accordingly 714. In this manner, a process control system may isolate process control functionality at the controller level, without requiring the involvement of a central computer, such as an operator workstation. This may enable a truly distributed processing architecture.

In a situation in which the communication link may represent a network having more than two I/O inter-controller devices connected, each I/O device may provide additional logic for addressing messages over the communication network to an appropriate receiving I/O device. The process controller initiating an inter-controller communication may include in the body of the message or signal address information identifying the appropriate second controller and/or a corresponding I/o inter-controller device associated with the second controller.

In one embodiment of the system illustrated in FIG. 5, primary communication network 22 may be an Ethernet network. The communication buses 76 may use one of a HART, 4-20 ma protocol, Foundation Fieldbus protocol, CAN, Profibus, AS-Interface protocol etc. The communication link between inter-process controllers may be a communication bus similar to the communication buses 76. This may be appropriate when there are few inter-controller I/O devices connected on the bus. When there is a greater number of inter-controller I/O devices, the communication link may be a second communication network such as an Ethernet network. The primary communication network or communication link may operate using an Ethernet, Token Ring, FDDI, ARCNET, WiFi, serial or parallel communication protocol. The communication link may operate on an intranet isolated from the public or over a public network such as the Internet. The primary communication network and communication link may operate using the same protocol. Likewise, the communication busses may be use the same type of physical connection using the same protocol or different protocols.

It is emphasized that the system and method described above may be suitable for situations in which a process control system needs to be reconfigured. Using the described method and system, advanced planning of inter-controller communication is not necessary to the extent of significantly changing the existing connections between workstations, process controllers, I/O devices and their associated field devices.

What is claimed is:

1. An input/output (I/O) bus connection system for use in a process control system comprising:
   a first I/O card including two interfaces, wherein a first interface of the first I/O card is communicatively coupled to a first process controller via a first bus;
   a second I/O card including two interfaces, wherein a first interface of the second I/O card is communicatively coupled to a second process controller via a second bus; and
   an inter-controller communication link between the first I/O card and the second I/O card separate from the first and the second bus,
   wherein the second interface of the first I/O card and the second interface are communicatively coupled to the inter-controller communication link;
   wherein the first process controller is configured to implement a control routine using one or more field devices by sending a control signal to one of the one or more field devices, via the first bus, and a further I/O card connected between the first bus and the one or more field devices, to provide coordinated process control functionality between the first process controller and the second process controller;
   wherein the first process controller is configured to send a signal to the second process controller via the first bus, the first I/O card, the inter-controller communication link and the second I/O card;
   wherein the first process controller is configured to determine whether one of a process parameter measurement signal, an alarm signal, or an event signal needs to be communicated to the second process controller;
   wherein the first process controller is configured to determine whether the field device under the control of the second process controller is to be adjusted based on the first controller signal.

2. The system of claim 1, wherein the inter-controller communication link comprises one of an intranet or the Internet, and.

3. The system of claim 1, wherein the inter-controller communication link comprises a communication network running one of an Ethernet, Token Ring, FDDI, ARCNET, WiFi, serial or parallel communication protocol.

4. The system of claim 1, wherein a plurality of input/output (I/O) cards, separate from the first I/O card, are operatively connected to the first process controller via the first bus, wherein the plurality of I/O cards includes at least one I/O card adapted for operative communication with a process control related field device or a safety related field device.

5. The system of claim 4, wherein a second plurality of input/output (I/O) cards, separate from the second I/O card, are operatively connected to the second process controller via the second bus, wherein the second plurality of I/O cards includes at least one I/O card adapted for operative communication with a process control related field device or a safety related field device.

6. The system of claim 4, wherein the first process controller implements the control routine to produce a device control signal based on one or more process parameter measurement signals and wherein a first interface of the at least one I/O card of the plurality of I/O cards is adapted to receive one or more device control signals from the first process controller for the first device via the first bus or to provide one or more process parameter measurements from the first device to the process controller.

7. The system of claim 1, wherein the process controller implements the control routine using one or more field devices by sending the control signal to one of the one or more field devices via the first bus and the further I/O card connected between the first bus and the one or more field devices and wherein the process controller sends a signal to a second process controller via the first bus, the first I/O card, the inter-controller communication link and the second I/O card and further comprising a third I/O card including a processor, a memory, and two interfaces, wherein a first interface of the third I/O card is communicatively coupled to a third process controller via a third bus and wherein a second interface of the third I/O card is communicatively coupled to the inter-controller communication link.

8. The system of claim 1, further comprising a third I/O card including a processor, a memory, and two interfaces, wherein a first interface of the third I/O card is communicatively coupled to a third process controller via a third bus and wherein a second interface of the third I/O card is communicatively coupled to the first process controller via the first bus.

9. The system of claim 1, further comprising a first communication network separate from the first bus, the second bus, and the inter-controller communication link, and wherein the first process controller and the second process controller are communicatively coupled to the first communication network to communicate with a host computer arranged to send and receive process control messages and safety messages.

10. A method of communicating between two process controllers within a process control system comprising:

transmitting a first controller signal from a first process controller to a first I/O device via a first bus, wherein the first bus is communicatively coupled to the first process controller and the first I/O device;

transmitting the first controller signal from the first I/O device to a second I/O device via a first communication network that is separate and independent from the first bus;

transmitting the first controller signal from the second I/O device to a second process controller via a second bus separate and independent from the first bus and the first communication network, wherein the second bus is communicatively coupled to the second process controller and the second I/O device;

with the first process controller, implementing a control routine using one or more field devices by sending the first controller signal to one of the one or more field devices via the first bus and a further I/O card connected between the first bus and the one or more field devices to provide coordinated process control functionality between the first process controller and the second process controller;

with the first process controller, sending a signal to the second process controller via the first bus, the first I/O card, the inter-controller communication link and the second I/O card;

determining at the first process controller whether a field device under the control of the second process controller is to be adjusted based on the first controller signal.

11. The method of claim 10, further comprising determining whether the first I/O device is connected to the first bus and foregoing transmitting the first controller signal to an operator workstation.

12. The method of claim 10, further comprising transmitting a device control signal from the second process controller to the field device if it is determined that the field device is to be adjusted.

13. The method of claim 10, further comprising relaying the control signal from the second process controller to a field device connected to an I/O device on the communication second bus.

14. The method of claim 10, further comprising a second communication network, separate and independent from the first bus, the second bus, and the first communication network, wherein the second communication network is communicatively coupled directly to the first process controller and directly to the second process controller and is further coupled to a host computer.

15. The method of claim 10, wherein the first bus and second bus use a first communication protocol, and the first communication network uses a second communication protocol different than the first communication protocol.

16. The method of claim 10, further comprising translating the first controller signal from a first protocol used by the first bus to a second protocol used by the first communication network.

17. The method of claim 16, further comprising translating the first controller signal from the second protocol used by the first communication network to a third protocol used by the second bus.

18. The method of claim 17, wherein the first and third communication protocols are the same.

19. The method of claim 10, wherein the first controller signal comprises one of a device control signal, a process parameter measurement signal, an event signal, or an alarm signal.

20. A process control system comprising:

a host computer arranged to send and receive process control messages;

a first controller operatively connected to the host computer via a first communication network and adapted to perform process control functionality;

a first I/O card operatively connected to the first controller via a first bus and adapted for operative communication with a process control related field device;

a second I/O card operatively connected to the first controller via the first bus and adapted for operative communication with a third I/O card, the second I/O card and third I/O card operatively connected via a second communication network separate from the first bus and the first communication network;

wherein the first controller is configured to implement a control routine using one or more field devices by sending a control signal to the process control related field device via the first bus and the first I/O card to provide coordinated process control functionality between the first controller and the host computer;

wherein the first controller is configured to send a further signal to a second controller via the first bus, the second I/O card, the second communication network and the third I/O card;

determining at the host computer whether one or more process parameter measurement signals needs to be communicated to a second controller;

determining at the host computer whether a field device under the control of the second controller is to be adjusted based on the host computer signal.

21. The process control system of claim 20, further comprising a fourth I/O card adapted for operative communication with the second I/O card and third I/O card via the second communication network and for operative communication with the second controller via a third bus.

22. The process control system of claim 20, further comprising a fourth I/O card operatively connected to the first controller via the first bus and adapted for operative communication with a fifth I/O card via a third communication network separate and independent from the first and second communication network and the first bus.

23. The process control system of claim 20, wherein the first controller implements the control routine to produce a device control signal based on the one or more process parameter measurement signals, and wherein a first interface of the first I/O card is adapted to receive one or more device control signals from the first controller for the process control related field device via the first bus or to provide one or more process parameter measurements from the process control related field device to the first controller.

24. The process control system of claim 20, wherein the first I/O card is adapted for operative communication with the process control related field device using one of a HART protocol, a 4-20 ma protocol, a Foundation Fieldbus protocol, a CAN protocol, a Profibus protocol, or an AS-Interface protocol.

25. The process control system of claim 20, wherein the third I/O card is adapted for operative communication with a second controller via a second bus.

26. The process control system of claim 25, wherein the first bus and the second bus operate using the same communication protocol.

27. The process control system of claim 26, wherein the first communication network and the second communication network operate using the same communication protocol.

28. The process control system of claim 27, wherein the second communication network comprises a communication network running one of an Ethernet, a Token Ring, an FDDI, an ARCNET, a WiFi, a serial or a parallel communication protocol.

29. The process control system of claim 28, wherein the second communication network comprises a communication bus between the second I/O card and third I/O card.

30. The process control system of claim 20, wherein the third I/O card is adapted for operative communication with the second controller.

31. The process control system of claim 30, further comprising a fourth I/O card connected to the first controller via the first bus and adapted for operative communication with a first safety-related field device, the fourth I/O card including a processor that executes a safety module for implementing the safety functionality using the safety-related field device.

32. The process control system of claim 31, further comprising a first message propagation device connected to the first bus, a second message propagation device connected to the second bus, and a fifth I/O device connected to the second bus, wherein the fifth I/O card is adapted for operative communication with a second safety-related field device, the fifth I/O card including a processor that executes a safety module for implementing safety functionality using the safety-related field device.

33. The system of claim 1, wherein the process controller implements the control routine using one or more field devices by sending the control signal to one of the one or more field devices via the first bus and the further I/O card connected between the first bus and the one or more field devices and wherein the process controller sends a signal to a second process controller via the first bus, the first I/O card, the inter-controller communication link and the second I/O card.

34. The system of claim 33, wherein the process controller sends raw data from the one of the one or more field devices to the second process controller via the first bus, the first I/O card, the inter-controller communication link and the second I/O card.

35. The system of claim 33, wherein the first I/O card includes a first processor and a first memory, and wherein the second I/O card includes a second processor and a second memory.

36. The method of claim 10, further including implementing the control routine using one or more field devices within the first process controller, and sending the control signal to one of the one or more field devices via the first bus and the further I/O card connected between the first bus and the one or more field devices.

37. The process control system of claim 20, wherein the first controller implements the control routine using one or more field devices by sending the control signal to the process control related field device via the first bus and the first I/O and wherein the first controller sends a further signal to a second controller via the first bus, the second I/O card, the second communication network and the third I/O card.

* * * * *

UNITED STATES PATENT AND TRADEMARK OFFICE
CERTIFICATE OF CORRECTION

| | | |
|---|---|---|
| PATENT NO. | : 7,865,251 B2 | Page 1 of 1 |
| APPLICATION NO. | : 11/540120 | |
| DATED | : January 4, 2011 | |
| INVENTOR(S) | : Gary K. Law et al. | |

It is certified that error appears in the above-identified patent and that said Letters Patent is hereby corrected as shown below:

In the Specification:

At Column 4, line 30, "periodic" should be -- periodic, --.

At Column 10, line 64, "a inter-controller" should be -- an inter-controller --.

In the Claims:

At Column 14, lines 12-13, "Internet, and." should be -- internet. --.

Signed and Sealed this

Twenty-seventh Day of December, 2011

David J. Kappos
*Director of the United States Patent and Trademark Office*